United States Patent
Liu et al.

(10) Patent No.: US 8,037,023 B2
(45) Date of Patent: Oct. 11, 2011

(54) SYSTEM AND APPARATUS FOR OPTIMALLY TRADING OFF THE REPLICATION OVERHEAD AND CONSISTENCY LEVEL IN DISTRIBUTED APPLICATIONS

(75) Inventors: Zhen Liu, Tarrytown, NY (US); Honghui Xia, Briarcliff Manor, NY (US); Hao Yang, Ossining, NY (US); Fan Ye, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/135,489

(22) Filed: Jun. 9, 2008

(65) Prior Publication Data

US 2008/0250087 A1 Oct. 9, 2008

Related U.S. Application Data

(63) Continuation of application No. 11/493,373, filed on Jul. 26, 2006, now Pat. No. 7,506,011.

(51) Int. Cl.
*G06F 17/30* (2006.01)
(52) U.S. Cl. ...................................................... 707/613
(58) Field of Classification Search ................ 707/613, 707/999.001, 999.201
See application file for complete search history.

(56) References Cited

U.S. PATENT DOCUMENTS

| | | | |
|---|---|---|---|
| 5,261,094 A * | 11/1993 | Everson et al. ................ | 1/1 |
| 5,713,017 A | 1/1998 | Lin | |
| 6,289,419 B1 | 9/2001 | Takahashi | |
| 6,839,810 B2 | 1/2005 | Takahashi | |
| 2003/0041074 A1* | 2/2003 | Vasudevan et al. ........... | 707/204 |
| 2004/0158588 A1 | 8/2004 | Pruet, III | |
| 2005/0144399 A1 | 6/2005 | Hosomi | |
| 2006/0106894 A1 | 5/2006 | Richardson | |

OTHER PUBLICATIONS

Haifeng Yu,Amin Vahdat,Design and Evaluation of a Continuous Consistency Model for Replicated Services,Computer Science Dept. Duke University,Durham,NC{yhf,vahdat}@cs.duke.ed.
Jalal Kawash,Consistency Models for Internet Caching, Dept. of Computer Science,American University of Sharjah,UAE,jkawash@ausharjah.edu.
S.B. Davidson,H.Garcia-Molina,D.Skeen,Consistency in Partitioned Networks,ACM Computing Survey,vol. 17,No. 3,Sep. 1985.
S. Adve,K. Gharachorloo,Shared Memory Consistency Models:A Tutorial, Rice University ECE Technical Report 9512,1995.
D. Abadi,Carney,Cetintemel,Cherniack,Convey,Lee,Stonebraker, Tatbul,Zdonik,Aurora: A new Model and architecture for data steam management,The VLDB Journal, 2003.

(Continued)

*Primary Examiner* — James Trujillo
*Assistant Examiner* — William Spieler
(74) *Attorney, Agent, or Firm* — George Willinghan; August Law, LLC

(57) ABSTRACT

Methods and systems are provided for optimally trading off replication overhead and consistency levels in distributed data replication where nodes are organized in a hierarchy. The root node has the original data that need to be replicated at all other nodes, and the replicated copies have a freshness threshold that must be satisfied. The data are propagated through periodic updates in the hierarchy. Each node periodically sends data to its child nodes. Given the freshness threshold, an algorithm and its distributed protocol can determine the optimal update period for each link of the hierarchy such that the freshness threshold is satisfied for every node and the overall replication overhead is minimized. The systems and methods can be used in any scenario where replicated data have consistency requirements, such as in a replicate overlay assisted resource discovery system.

17 Claims, 9 Drawing Sheets

Example of the bottom-up and top-down phases of the distributed consistency control algorithm

OTHER PUBLICATIONS

N.Beckmann,h.-P. Kriegel,The r*-Tree: An efficient and robust access method for points and rectangles,ACM SIGCMOD, 1998,West Germany.
S.Berchtold,C. Bohm,H.-P. Kriegel,The Pyramid-Technique:Towards Breaking the Curse of Dimensionality,ACM-SIGCMOD,1998,Seattle,Washington.
S.Berchtold,D. Keim,H.-P. Kriegel,The X-Tree:An Index Structure for High-Dimensional Data,In VLDB,1996,Munich, Germany.
A.Bharambe,M.Agrawal,S.Seshan,Mercury:Supporting Scalable Multi-Attribute Range Queries,In SIG-COMM,2004,Pittsburgh, PAB. Bloom,Space/Time Trade-offs in Hash Coding with Allow.
B. Bloom,Space/Time Trade-offs in Hash Coding with Allowable Errors, Communications of the ACM 13,7, 1970,Newton Upper Falls, MA.
P. Bonnet,J. Gehrke,P.Seshadri,Towards Sensor Darabase Systems,2nd Int'l Conference on MObile Data Management, Jan. 2001, Hong Kong.
Declan Butler, Everything,Everywhere, Nature 440,Mar. 23, 2006J. Chen,D.DeWitt,F. Tian, Y.Wang,Niagra:A Scalable Continuous Query System for Internet Databases,SIGMOD,2000.
M.Cherniack,H.Balakrishnan,M.Balazinska,D.Carney,U. Cetintemel, Y.Xing,S. Zdonik,Scalable Distributed Stream Processing,In CIDR Conference,2003.
K.Czajkowski,S.Fitzgerald,I. Foster, C. Kesselman,Grid Information sErvices for Distributed Resource Sharing,Proceedings of the 10th IEEE International Symposium,Aug. 2001.
D. Spence, T.Harris,XenoSearch:Distributed Resource Discovery in the XenoServer Open Platform,2003,Cambridge,UK.
D.Ganesan,B.Greenstein,D.Perelyubskiy,D.Estrin,J.Heidemann,An Evaluation of Multi-Resolution Storage for Sensor Networks,2003,ACM.
P. Gibbons,B. Karp,Y.Ke,S. Nath,S.Seshan, IrisNet:An Architecture for a Worldwide Sensor Web,IEEE Pervasive Computing,4(Oct.-Dec. 2003).
J.heidemann,F. Silva,C.Intanagonwiwat,R.Govindan,D.Estrin,D. Ganesan, Building Efficient Wireless Sensor Networks with Low Level Naming,ACM SOSP'01,2001.
R.Huebsch,J.Hellerstein,N.Lanham,B.T.Loo,S.Shenker,I. Stoica,Querying the Internet with PIER,29th VLDB Conference, 2003, Berlin, Germany.
Piotr Indyk,Rajeev Motwani,Approximate Nearest Neighbors:Towards Removing Curse of Dimensionality,in ACM STOC, 1998.
P. kulkarni,D.Ganesan,P. Shenoy,Qifeng Lu, SensEye:A Multi-tier Camera Sensor Network,2005,ACM Multimedia.
M. Balazinska,H. Balakrishnan, David Karger,INS/Twine:A Scalable Peer-to-Peer Architecture for Intentional Resource Discovery,2002,International Conf. on Pervasive Computing.
S.R. Madden,M.J.Franklin,J.M. Hellerstein,Wei Hong,TinyDB:An Acqusitional Query Processing System for Sensor Networks, 2005,TODS.
Michael Mitzenmacher, Compressed Bloom Filters, 2002, IEEE Transactions on Networking 10,5.
P.V. Mockapetris,Kevin J. Dunlap,Development of the Domain Name System, 1998,pp. 123-133,in SIGCOMM.
R.Motwani,J.Widom,A.Arasu,B.Babcock,S.Babu,M.Datar,G. Manku,C.Olston,J.Rosenstein,R.Varma, Query Processing,Resource Mngt.,and Approximation in Data Stream Mgnt.System,2003,CIDR.
D.Oppenheimer,J.Albrecht,D.Patterson,A.Vandat,Design and Implementation Tradeoffs for Wide-Area Resource Discovery,Jul. 2005,14th IEEE Symposium HPDC-14.
P.Pietzuch,J.Ledlie,J.Schneidman,M.Roussopoulos,M.Welsh,M. Selzter,Newtwork-Aware Operator Placement for Stream Processing Systems,2006,Harvard University.
J.Shneidman,P.Pietzuch,J.Ledlie,M.Roussopoulos,M.Seltzer,M. Welsh,Hourglass:An Infrastructure for Connecting SEnsor Networks and Application,2004,Harvard EECS Dept.,TR-21-04.
Chunqiang Tang,Zhichen Xu,S.Dwarkadas,Peer-to-Peer Information Retrieval Using Self-Organizing Semantic Overlay Networks,Aug. 2003,ACM SIGCOMM.
R.V.Renesse,K.Birman,W.Vogels,Astrolabe:A Robust and Scalable Technology for Distributed System Monitoring,Management,and Data Mining,2003,ACM Transactions on Computer Systems.
W.Yeong,T.Howes,S.Kille,Lightweight Directory Acess Protocol,1995, RFC1777.
W.Yeong,T.Howes,S.Kille,Lightweight Directory Acess Protocol (v3), Dec. 1997,RFC 2251.
Java Naming and Directory Interface (JNDI), S8un MIcrosystems,,Java Naming and Directory Interface,http://java.sun.com/products/jndi/docs.html.
D. Oppenheimer,J.Albrecht,D. Patterson,A.Vahdat,Distributed Resorce Discovert on PlanetLab with SWORD,Dec. 2004,First Workshop on Real,Large Distributed Systems.
L.Peterson,T.Anderson,D.Culler,T.Roscoe, A Blueprint for Introducing Disruptive Technology into the Internet,Jul. 2002,PLanetLab.
International Search Report in corresponding PCT application No. PCT/US07/71403.

* cited by examiner

Example of the bottom-up and top-down phases of the distributed consistency control algorithm A ROADS server keeps 4 types of summaries: children's, attached resources', branch, replicated ones. A client resolver uses two queues to maintain which servers it has queried and has yet to query Total response time (in ms) as function of query selectiveity (%). ROADS outperformes central repository with multi-thread resolver The detailed step-by-step time breakdown of one REQUEST-REPLY exchange between resolver and a server The major portions of response time (in ms) as functions of query selectivity (%). The dominatoring parts are query execution and REPLY sending times.

The original summary of data_rate for resource owner D4 at server s4 increases by one each second; the replicated summaries at server s1, s2, s3, s6, s7, s8 are tracked and compared to that of s4. The consistency bound is 250 seconds.

The replicated summaries tracks the changes of original summary, with lag times always within the 250 seconds bounds A more flexible server organization where each server may have more than one parent. Server b2 has A1, A2 as parents; C7 has b2, b4 as parents.

SYSTEM AND APPARATUS FOR OPTIMALLY TRADING OFF THE REPLICATION OVERHEAD AND CONSISTENCY LEVEL IN DISTRIBUTED APPLICATIONS

CROSS-REFERENCE TO RELATED APPLICATIONS

The present application is a continuation of co-pending U.S. application Ser. No. 11/493,373, filed Jul. 26, 2006. The entire disclosure of that application is incorporated herein by reference.

FIELD OF THE INVENTION

The present invention relates to the field of management and administration of information technology systems and in particular to consistency maintenance for distributed data replication within information technology systems.

BACKGROUND OF THE INVENTION

Data replication is a widely used technique for storing copies of original data at multiple locations in order to improve data availability and overall system performance. Data replication is used in a variety of information technology systems, including content delivery networks, peer to peer storage and exchange, application-level multicast and distributed data backup among others.

In many such systems, the original data located at one node need to be replicated to a set of other nodes. All these nodes are usually organized in a tree hierarchy, and the node having the original data is the root of the hierarchy. The data are replicated over each link of the hierarchy periodically. For example, the root node periodically sends its data to its child nodes, each of which periodically sends the data received from its parent to its children. In such a way, data are refreshed throughout all nodes in the hierarchy.

One information technology system where data replication is used and data consistency needs to be maintained is a resource discovery system. In order to execute applications or services in a computing system such as a networked computing system, resources within the computing system and also external to the computing system need to be allocated among these applications. These resources include computing hardware resources, e.g. central processing unit (CPU) resources, storage capacity, such as hard drive size, memory size in physical machines and data collectors or data sensors. The available resources can include both static and dynamic resources. For example, the memory size or network adaptor speed of a given machine is usually fixed, and the available memory or bandwidth changes frequently over time.

In order to allocate resources among a variety of contemporaneous resource demands, a repository of available resources needs to be created and maintained. Creation and maintenance of this repository includes discovering resources that are available for allocation. Resource discovery can locate remote resources subject to the specified requirements of a given resource demand and is widely used in many distributed computing systems for a variety of applications. For example, in grid computing, machines or nodes that possess the required CPU and memory resources to run an application are discovered or identified, and then the application is deployed on those identified machines.

A variety of approaches to resource discovery have been proposed. These proposed approaches include the domain name system (DNS) as described in P. Mockapetris & K. J. Dunlap, *Development of the Domain Name System*, Proceedings of SIGCOMM'88, Stanford, Calif., pp. 123-133 (1988), the lightweight directory access protocol (LDAP/X.500) as described in M. Wahl, T. Howes & S. Kille, *RFC 2251-Lightweight Directory Access Protocol (v3)*, December (1997), ITU-T, Recommendation X.500, January (2001) and D. W. Chadwick, *Understanding X.500—The Directory* (1996), and the java naming and directory interface (JNDI) as described in Sun Microsystems, Java Naming and Directory Interface—JNDI Documentation, http://java.sun.com/products/jndi/docs.html. All of these systems provide directory service to discover resources; however, these previous attempts at resource discovery were arranged mostly for static resources or resources that change quite slowly, for example host name to internet protocol (IP) address mapping. Support for dynamic resources that vary frequently, for example on the scale of tens of minutes or less, using these systems is very limited. In addition, these systems assume the space or universe of available resources is globally organized into a pre-defined tree hierarchy that is managed in a delegated manner. That is, each organization agrees on such a hierarchy and "owns" a portion of the tree.

Global organization and management of resources, however, may not exist. In addition, global organization introduces complexity and restrictions into the allocation of resources. For example, it can be difficult to pre-define the resource hierarchy if new types of resources are to be added in the future. Due to administrative and trust reasons, autonomous systems may have different perceptions on how resources should be organized. Systems that already employ different resource discovery services need to collaborate for common tasks, but it is very difficult to change the individual, legacy resource discovery services.

One scalable wide-area resource discovery tool (SWORD) is described by David Oppenheimer, Jeannie Albrecht, David Patterson, and Amin Vahdat in *Distributed Resource Discovery on PlanetLab with SWORD*, First Workshop on Real, Large Distributed Systems (WORLDS '04), December 2004. This resource discovery service was created for PlanetLab as described by Larry Peterson, Tom Anderson, David Culler, and Timothy Roscoe in *A Blueprint for Introducing Disruptive Technology into the Internet*, July 2002. The resource discovery tool employed by SWORD utilizes a distributed hash table (DHT) based peer-to-peer network to support multi-dimensional range queries on dynamic resources. One disadvantage of using a peer-to-peer network is that the management of the system is challenging. Peer-to-peer networks are arranged to allow high autonomy of individual nodes, making it quite difficult to facilitate, especially centralized, control and management in the system. In addition, the resource discovery tool in SWORD requires that each individual autonomous system export its complete resource records to the peer-to-peer network. This can become a problem due to trust issues. Individual autonomous systems may not be willing to expose their original records to the outside world.

Creation and maintenance of the repositories of available resources consume overhead, i.e. system resources. A greater quantity of maintenance produces a greater cost on system overhead. This maintenance includes providing reliable and consistent data that reflect the most recent and accurate information about system resources. Frequent updates, however, consume more system resources. Current methods for maintaining the repositories of available system resources do not balance the desire for the most up to date data against the desire to minimize system overhead. Therefore systems and methods are needed that provide for the creation, maintenance of repositories of resources for the purposes of allocating these resources among a variety of resource demands such that an acceptable level of freshness is provided in the repositories while the consumption of system overhead is optimized.

SUMMARY OF THE INVENTION

Systems and methods in accordance with the present invention optimize the amount of overhead utilized for consistency maintenance of data replication in a replication hierarchy. Since the original data can be dynamic and can change continuously, it is desirable to ensure a certain level of consistency of replicated data copies. There exists a tradeoff between the consistency levels and the replication overhead. In general, the more frequent the update over each link, the better the consistency. However, more frequent data updates consume more overhead. Given a desired consistency level, exemplary systems and methods in accordance with the present invention determine an optimal update frequency over each one of the plurality of links in the hierarchy such that the desired consistency level is satisfied and the replication overhead is minimized.

Embodiments of the present invention can be used in various types of information technology systems including, but not limited to, content delivery networks, peer to peer data exchange and application level multicast. Although examples given herein illustrate the use of the present invention for determining the optimal replication overhead for a federated resource discovery system, the present invention is not limited to application with those types of systems.

Systems and methods in accordance with exemplary embodiments of the present invention, optimally trade off the replication overhead and consistency level in distributed applications where nodes are organized in a tree hierarchy. The root node of the hierarchy has the original data that need to be replicated to a plurality of other nodes. The replication is done through the periodic update messages over each link in the hierarchy. Every node periodically sends data received from its parent to its children. In this way, data are replicated to every other node in the hierarchy.

Since the original data change over time, replicated copies of the data that are distributed throughout the hierarchy require a certain level of consistency compared to the original data. The consistency requirements from a given origin node to a tree topology of replication nodes can be formalized and formulated. The optimization problem expressed by this formulation can be solved using an algorithm for computing the optimum update periods over all links of the hierarchy such that the overall message overhead is minimized while satisfying the given consistency requirements. The algorithm has a distributed implementation that can run in the hierarchy and can minimize the overall replication overhead using constant state and message overhead at each node.

Systems and methods in accordance with the present invention, include a method for updating replicated data stored in a plurality of nodes organized in a hierarchy and linked through networks. The nodes include servers and suitable hierarchies include tree hierarchies. A freshness threshold is defined for any and all data stored at any given node within the network hierarchy of nodes. Then an update period across each one of a plurality of links between the nodes in the network hierarchy for data stored at each node is determined such that the freshness threshold is satisfied for all data stored at any given node and overhead associated with updating data is minimized. The data stored at the nodes are updated in accordance with the determined update periods.

In order to determine the update period, a current data update period and a sum of all data update periods from its parent node to one or more leaf nodes is communicated from each node in the hierarchy of nodes to a parent node. The current data update period includes a period of time in which a parent node of a given node should send a data update to that node. The communicated current data update periods and update period summations are adjusted so that the freshness threshold is satisfied at every leaf node within the hierarchy of nodes. In addition, determination of the update period also includes maintaining state data at each node within the hierarchy of nodes. The state data at a given node include a current data update period associated with that node and expressing the period at which its parent node should send a data update and a summation of the data update periods from its parent node to any descendent leaf node of that node. A scale factor associated with each child node of the non-leaf node is maintained at each non-leaf node.

In one embodiment, the state data maintained at each node are communicated up through the hierarchy of nodes to a root node. In order to communicate the state data up through the hierarchy, a data update period for the receiving node using the data update periods in the communicated state data is calculated at each node within the hierarchy of nodes receiving communicated state data from its children nodes if all sums of the data update periods communicated in the state data are equal. Alternatively, if it is determined that at a given node all of the sums of the data update periods communicated in the state data are not equal, an arbitrary child node of the given node is selected, and the sum of the data update periods associated with the arbitrary child node is used to calculate a scale factor for every other child node. The calculated scale factors are used to calculate updated state data for all of the children of the given node, and the updated state data are communicated from the given node up through the hierarchy of nodes.

The state data are received at a root node from all children nodes of that root node, and adjustments to the state data received at the root node are made to ensure that the freshness threshold is achieved at every leaf node of the root node. Adjustments to the state data include adjusting summation update periods at each leaf node to equal the defined freshness threshold. In addition the summation update periods associated with each leaf node are adjusted to a common equal value, and this common equal value is compared to the freshness threshold. A scale factor is obtained as the ratio of the freshness threshold to the common equal value, and the current update period is adjusted at each leaf node using the scale factor. The scale factor is communicated to each child node of the root node, and the current update period for each child is adjusted using the scale factor.

DETAILED DESCRIPTION

Figure 1:
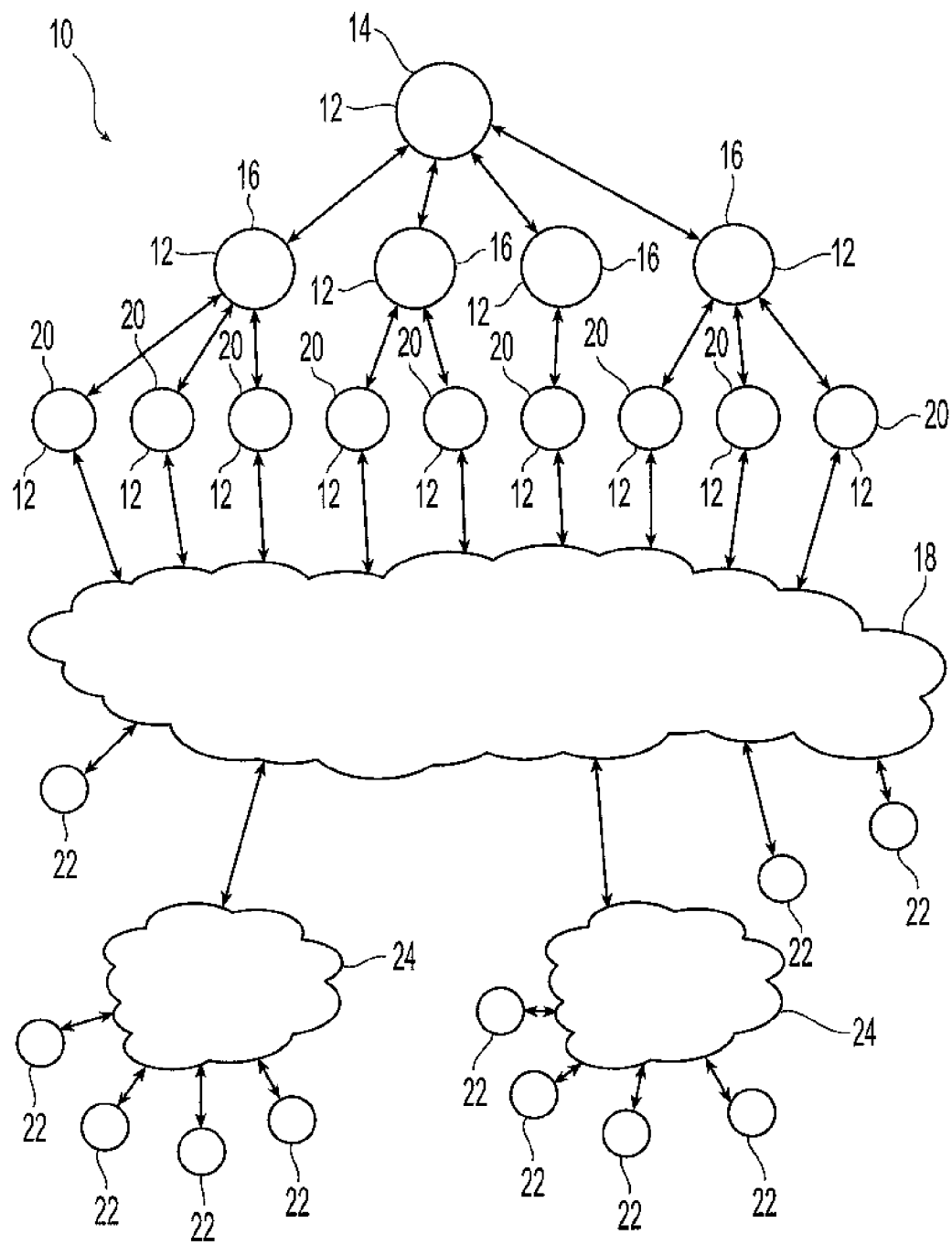
FIG. 1 is a schematic representation of an embodiment of a dedicated server hierarchy and distributed computing system in which the present invention can be used.

Referring initially to FIG. 1, an exemplary embodiment of a system 10 for use with exemplary embodiments for updating replicated data stored in a plurality of nodes organized in a hierarchy and linked through networks to maintain a desired level of data consistency while minimizing system overhead in accordance with the present invention is illustrated. As illustrated, the system 10 is a federated resource discovery system in accordance with exemplary embodiments of the present invention. The federated resource discovery system is one exemplary information technology system in which methods for maintaining consistency levels with optimal overhead can be applied. However, application of the methods for maintaining consistency levels with optimal overhead is not limited to federated resource discovery systems but can be applied to a variety of information technology systems and associated hierarchies.

Beginning initially with a discussion of the organization and use of federated resource discovery systems in accordance with exemplary embodiments of the present invention, the federated resource discovery system includes a plurality of dedicated servers 12 (D-servers) arranged in accordance with a pre-determined hierarchy. The dedicated servers are in communication with each other through this hierarchy and can exchange files or data. Suitable servers are known and available in the art and include any type of processor or processing unit capable of processing commands, storing data and communicating with other servers. Suitable hierarchies include, but are not limited to tree and pyramid hierarchies. Preferably, the servers are arranged in a tree hierarchy and include a plurality of leaf node D-servers 20, a plurality of intermediate node D-servers 16 and a root node D-server 14. All of the D-servers can be located in a single location, for example as part of a dedicated server farm. Alternatively, the servers are distributed in various locations and are in communication across one or more networks. For example, each D-server can be located in a separate domain or organization. The servers can be strictly dedicated to the hierarchy or can be multi-purposes servers that provide other services or functionalities outside of the hierarchy.

The system also includes a plurality of resource discovery servers associated with specific domains or organization and referred to as O-servers 22. Each O-server can be associated with a separate domain or two or more O-servers can be associated with the common domain. Suitable types of O-servers are the same as for the D-servers. In one embodiment, all of the O-servers are separate and distinct from the D-servers. Alternatively, at least one O-server and one D-server are a common server. In general, the O-servers are arranged as a widely distributed system of servers. Each O-server is in communication with at least one of the D-servers across one or more networks. For example, the distributed O-servers are in communication with the D-servers across a wide area network 18 such as the Internet. In addition, other groups of O-servers may also communicate with the D-servers through one or more local area networks 24, for example the local area networks associated with a given domain or internet service provider. As used herein, the communications among the various servers are two-way communications in that each server can transmit and receive data to any other server. Although each O-server can communicate with any one of the D-servers, preferably, each O-server is identified with and communicated with one of the D-servers that represents a leaf node in the tree hierarchy. Therefore, the O-server becomes a child node of that D-server in the tree hierarchy.

Each O-server can be a single server or a distributed service within the given domain or organization. Each O-server is capable of discovering resources within its organization, of updating stored resource data, of summarizing resource data in accordance with a desired level of granularity, of communicating resource data to other servers and of receiving resource data from other servers. The resources contained within a given organization are organized in accordance with the particular or proprietary format of the organization, and the data or attributes describing these resources in that format are obtained and maintained within the O-server. The particular or native format for the attributes used to describe the resources includes the conventions used to name a particular type of resource. Variations in attribute formats arise from the use of different names to describe the exact same resource, e.g. memory vs. RAM, and the use of different resources having the same basic functionality. For example, one organization may use RAM as its primary storage source and another organization may use flash memory as its primary storage source. Both provide the same basic functionality to their respective organization but would have different attributes to describe the resources.

Since each O-server is in communication with and capable of exchanging data with one or more of the distributed dedicated servers, D-servers, contained within the hierarchical structure, each O-server exports the resource attribute data stored on that O-server in accordance with the particular format or protocol of its organization to one of the D-servers. This D-server is the parent D-server to the O-server. Therefore, the various organizations do not have to be formatted in accordance with a universal format.

A description of any given resource, including the identification, location and capabilities of that resource, is provided using the plurality of attributes that are associated with that resource and are expressed in the resource attribute data. These attributes can take the form of qualitative or quantitative descriptors. In one embodiment, the attributes are provided in quantitative numerical forms such as real or integer numbers, categorical data and numerical intervals, among others. Each attribute associated with a given resource can be thought of as a dimension of the resource to which it is associated. A larger amount of data or attributes correlates to a greater or higher dimensionality. A greater dimensionality requires more storage space to store the associated data. However, except for the O-server associated with the organization in which the resource is located, the entire dimensionality for every resource does not need to be maintained at every server within the hierarchy. In fact, at any given D-server, only a sufficient amount of information is needed to route a query from that D-server in the direction of the O-server containing all of the attribute data for the resource. Therefore, any given D-server only needs a summary or aggregate representation of the attributes for any given resource.

Figure 2:
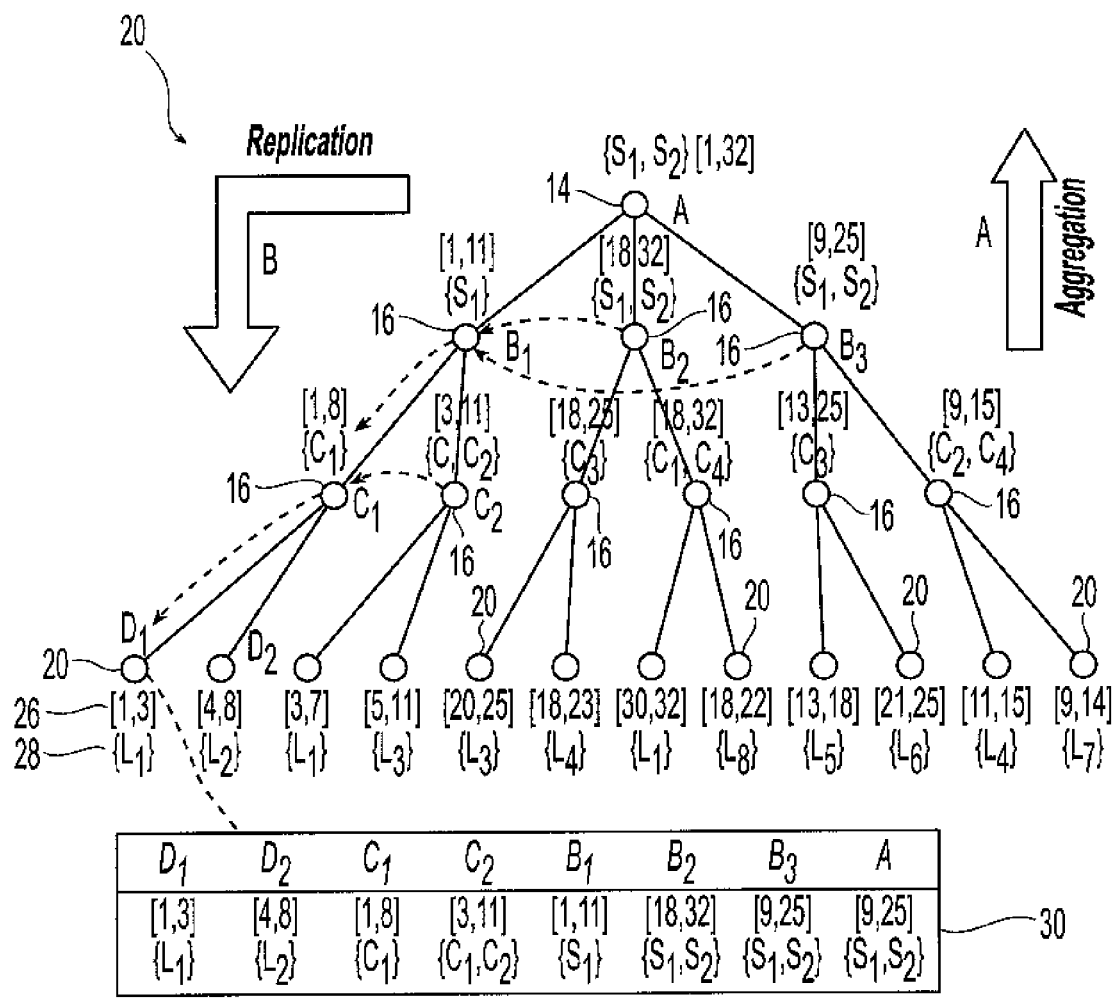
FIG. 2 is a schematic representation of an embodiment of a dedicated server hierarchy in which the present invention can be used.

Referring to FIG. 2, an exemplary embodiment of a tree hierarchy of D-servers 26 for use in resource discovery and allocation in accordance with the present invention is illustrated in FIG. 2. This tree hierarchy resource discovery system includes a plurality of the individual D-servers including the root D-server 14, the intermediate node D-servers 16 and the leaf node D-servers 20. Each leaf node D-server 20 contains the resource attribute data communicated to it from one or more O-servers. These resource attribute data include quantitative data 26 such as ranges of numbers and qualitative data 28 such as lists or sets of components.

In order to improve the storage of resource attribute data at any given D-server, summaries or aggregations of the resource attribute data associated with the resources and communicated to that D-server are created using aggregation functions. In general, aggregation functions generate summarized data that are of coarser granularity, e.g. a lower dimensionality, than the original data. Lower dimensionality is achieved by reducing the number of attributes or by reducing the amount of data or information associated with a given attribute. In one embodiment, aggregation includes decreasing the amount of data associated with a given attribute. Therefore, for a given attribute, an aggregation function is applied utilizing all resources having data associated with that attribute, and aggregation involves aggregation with respect to a given attribute. For example, for an attribute that is described using a range of acceptable numerical values and having the form of the upper and lower bounds on that range, the aggregation function is applied using the upper and lower bounds associated with each resource associated with that attribute and communicated to a given D-server. Each resource has, for that attribute, upper and lower bounds. For a given set of resources, all of the acceptable ranges of numerical values for all of the resources will fall within a range defined by the smallest lower bound associated with all of the resources and the largest upper bound associated with all of the resources. Therefore, the aggregated attribute contains the smallest overall lower bound and the largest overall upper bound. A separate attribute for each resource is not maintained at the D-server. Only the aggregate attribute containing the overall upper and lower bounds. This aggregate attribute is communicated upwards through the hierarchy of D-servers and ultimately the root D-server. The D-server in the hierarchy that receives the aggregated attribute obtains a grainier or broader view of the resources below it in terms of that attribute. That D-server may not know the range associated with any resource, but the D-server will know that any resource associated with its children nodes has for that attribute upper and lower bounds that fall within the upper and lower bounds of its aggregated attribute. When a given D-server, for example one of the intermediate D-servers, receives the aggregated attribute data from its children, that D-server further aggregates the data along each dimension. Again, for a quantitative or numerical attribute, the D-server takes the smaller of all lower bounds and greatest of all upper bounds, thus obtaining the new lower and upper bounds. This further aggregated attribute is communicated to the parent of the D-server. This process is repeated from D-server to D-server until the root server in the hierarchy is reached.

For a categorical attribute 28, a set or list is used to represent the members or categories included in the attribute. For example, the attribute can be an identification of the types of communication protocols that a given resource can support, and the attribute is represented by a set containing an identification of the supported communication protocols. Aggregation includes taking a combination or union of all the attribute sets associated with the resources and received from an O-server or a child D-server. Attribute sets representing the union of all sets are communicated up through the hierarchy, being further aggregated or combined at each level. As shown in FIG. 2, aggregation repeats at each server, from the leaf node D-servers 20 at the bottom up to the root D-server 14 at the top. The root D-server maintains a superset that contains an identification of all the categories for the attribute for all available resources. The root D-server receives and aggregates the attribute data for all resources discovered and available for allocation to one or more resource demands such as an application running in a given computing system. Although lower and upper bound and set union aggregation functions were used in the examples, other forms of aggregation functions can be used as well, as long as the aggregation function reduces the data size and assists in directing the search towards available resources.

In one embodiment, an aggregation function is suitable for use with location attributes, e.g. street address, city, county, state. For example, at the level of the leaf node level D-servers, the location attribute contains a sufficient amount of information to describe or circumscribe a city block sized rectangle in which a given resource, e.g. a video camera, is located. As illustrated in FIG. 2, the set of locations at each leaf node D-server is given in a set of locations {L}, which could give as much detail as exact street address or exact map grid. As the location attribute is aggregated and communicated to intermediate D-servers 16 the amount of detail provided in the location information is given with decreased specificity, e.g. city name {C} and state name {S}. The city name set contains all of the cities contained in all the location attribute sets communicated to that intermediate D-server from its children. At the root D-server level, the location attribute would only specify that all resources are located within a given state.

In general, the process of aggregation is utilized in the communication of attribute data up through the hierarchy as indication by the direction of arrow A. Replication is used to communicate the aggregated data down through the hierarchy to the leaf node D-servers or intermediate D-servers as indicated by arrow B. Replication is used to communicate more information throughout the entire structure of the hierarchy to make responding to queries more efficient. In one embodiment, the summarized data of a given D-server's siblings and that D-server's ancestors' siblings are periodically sent top-down in the hierarchy from that D-server to a recipient D-server and cached by the receiving D-server. For example as illustrated in the expanded list 30 in FIG. 2, a given leaf node D-server $D_1$ contains its own aggregated resource attribute data and the replicated aggregated resource data of leaf node D-server $D_2$, which is its sibling, intermediate D-server $C_1$, it parent, intermediate D-server $C_2$, its parents sibling, intermediate D-server $B_1$, its grandparent, intermediate D-servers $B_2$ and $B_3$, its grandparents siblings, and root D-server A. Therefore, sufficient information about all of the resource allocation data submitted to the hierarchy of D-servers is maintained at a single leaf node within the hierarchy such that resource allocation queries can be received and processed at that leaf node without having to communicate that query to the root D-server for processing. That is, the leaf nodes have a sufficiently detailed picture of all available or identified resources.

Therefore, each server forwards its summarized and aggregated data up through the hierarchy and propagates the aggregated data of servers located upstream in the hierarchy down through the hierarchy towards the leaf nodes. For example, D-server node $B_1$ receives the aggregated attribute data of D-servers $B_2$ and $B_3$ from root D-server A and forwards this aggregated attribute data to both D-servers $C_1$ and $C_2$. D-servers $C_1$ and $C_2$ upon receipt of the aggregated attribute data continue its propagation down the hierarchy towards the leaf level servers.

Using replication to communicate resource information among the various D-servers within the hierarchy, each D-server contains the summary or aggregate copy of at least a portion and potentially the entire set of global resources, speeding up resource discovery and query times. In general, the amount of detail that a given D-server has about any particular resource is proportional to the distance, e.g. the number of intermediate node D-servers and O-servers, between that D-server and the resource. For shorter distances between the D-server and the resource, a higher degree of specificity or detail is maintained in that D-server about the resource. As the distance grows, the D-server will still maintain information about the resource, but at much coarser granularity. For example, D-server node $D_1$ knows the locations of camera records stored at D-server node $D_2$ at a city block level of specificity; however, D-server node $D_1$ only knows the locations of camera records for D-server nodes $B_2$ and $B_3$ at a state level of specificity. Reducing the level of specificity and increasing the granularity with distance ensures that the total storage and message overhead does not become exceedingly large. In one embodiment, for a node degree of k in a hierarchy containing n servers, the storage complexity is about k log n at each server.

Figure 3:
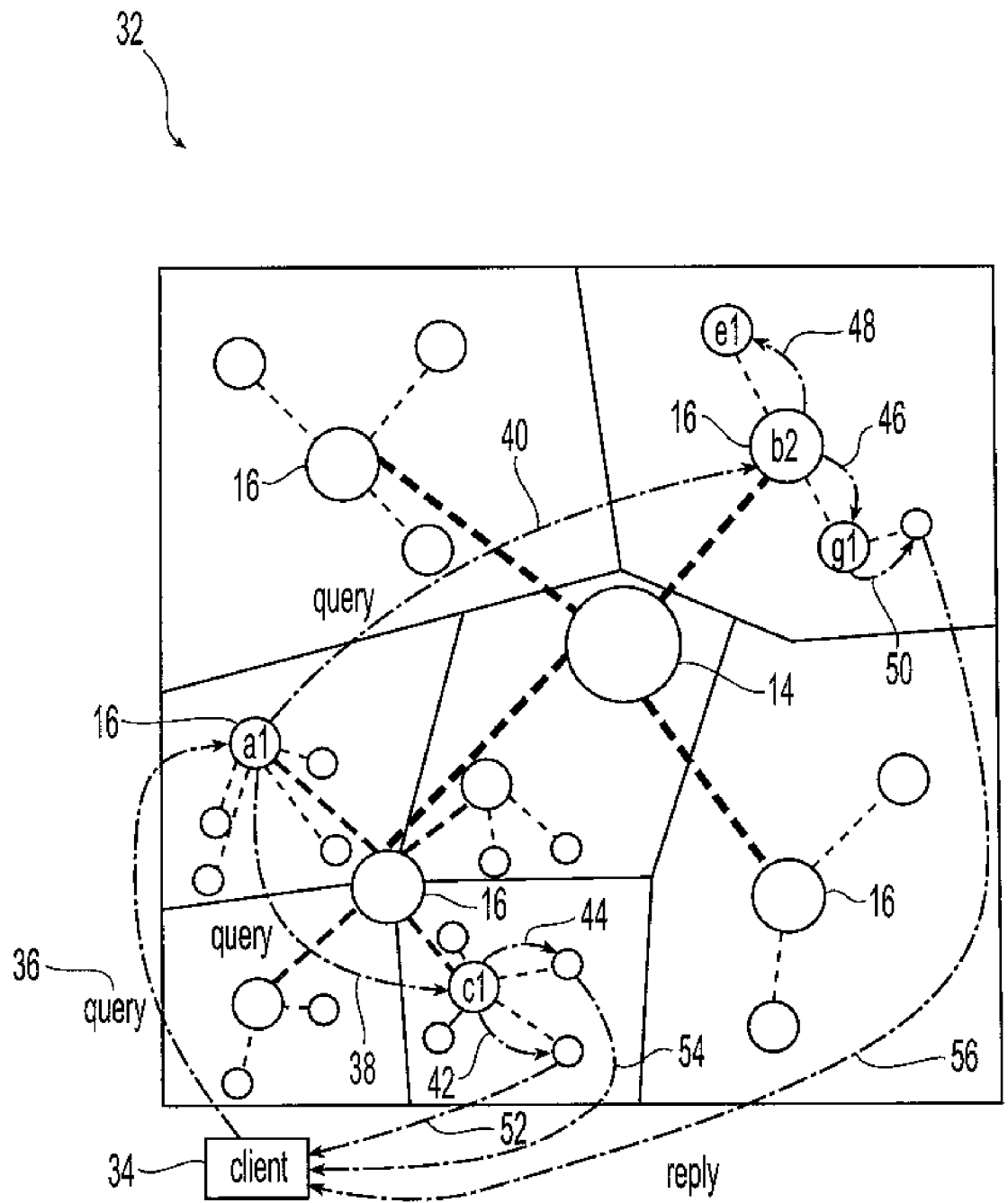
FIG. 3 is a schematic representation illustrating an embodiment of query processing in accordance with the present invention.

Replication also allows queries to be sent to any D-server within the hierarchy and not just the root D-server. Referring to FIG. 3, an exemplary embodiment illustrating the processing of resource queries using a given hierarchy of D-servers is shown. A client 34 submits a query 36 to one of the D-servers a1 in the hierarchy. This D-server a1 searches the summarized or aggregate data stored at that D-server, including is own summarized data and any replicated data that has been communicated to it. Based upon this search, the D-server a1 determines that its sibling D-server c1 and its uncle D-server b2 contain information about the resources required by the query. D-server a1 forwards the query 38, 40 to it sibling and uncle D-servers c1 and b2. These D-servers c1 and b2 then search through the data of their D-servers children, forwarding the query to those children D-servers possessing relevant resource information 46, 48. The process of searching for resource attribute data in subsequent children is repeated to route the query to one or more of the O-servers 42, 44, 50. The O-servers are children nodes of the leaf node D-servers in the tree hierarchy. Each O-server, in response to the query, searches its own database for the detailed resource records and returns the results to the client 52, 54, 56. As illustrated, the initial query 34 was not submitted or forward to the root D-server 14, but was submitted to an intermediate node D-server. From that point, the query was processed and forwarded to the O-servers, that is the domains or computer systems, containing the resources responsive to the query.

In addition to decreasing response time, replication improves the robustness or resiliency of the hierarchy system, for example when faced with the failure of one or more of the D-servers including the root D-server. If the root D-server 14 fails or crashes, queries submitted to the hierarchy can still be processed and answered by the remaining available D-servers. In one embodiment, each D-server within the hierarchy maintains periodic "heart-beat" messages along each communication link with its children servers and parent server. These heart-beat messages test the availability of the communication link and the server. If a given heart-beat message indicates that a server or communication link, for example associated with the parent D-server, is not accessible, the D-server chooses an uncle D-server as its new parent. This choice can be made randomly or in accordance with one or more pre-determined selection criteria. If the parent D-server is the root D-server of the hierarchy system, one of the children is elected as the new root. Suitable methods for the election of a new root D-server include, but are not limited to, selecting the child D-server having the smallest IP address, considering the current load on each child D-server and combinations thereof. In general, eliminating the need to submit or forward every query to a single root D-server alleviates the associated bottleneck and distributes the computation load throughout the hierarchy, reducing query response times.

Since the replicated summaries are used to discover which other servers have required resource data, it is important that the replicated summaries are updated on time. The replicated summaries preferably accurately represent the current state of available resources including resources that are not currently available or resources that have been recently added. Otherwise, outdated summaries will lead the query forwarded to incorrect servers. In one embodiment, the summarized data are soft-state. For example, each D-server maintains a time-to-live (TTL) value for each dimension of the summarized data. In general, the data are refreshed periodically as new data are received from children or parents. As long as refreshed data are received in compliance with the prescribed TTL values, the summarized data is maintained as current and reliable. However, when a resource is removed or a child D-server goes off-line, refreshed data will not be received within the constraints set by the TTL values. Therefore, the summary data associated with these are removed from a given D-server when those data expire in accordance with the TTL values. Therefore, outdated data, changes to the hierarchy topology and changes in the available resources do not interfere with or corrupt resource discovery in response to the queries.

In general, the process of replication incurs overhead as storage, processor and communication resources are consumed. Therefore, exemplary embodiments in accordance with the present invention also include methods and systems to minimize the impact of this overhead on overall system performance and resource allocation while preserving the desired level of updating in the replicated data. In one embodiment, a distributed algorithm is used that sets the optimal update period for each link.

Additions and corrections, in addition to losses, to the hierarchy topology and to the collection of available resources are also taken into account. For example, a given D-server will rejoin a reformatted hierarchy topology following the loss of its previous parent D-server and its subsequent re-connection with its new parent D-server. Upon connection with the new parent D-server, the child D-server forwards is aggregated or summarized data to the new parent.

In one embodiment, data replication is carried through to the last leaf D-server nodes; however, the O-servers are not involved in the replication of any data. The O-servers only export their data in suitable form, for example a summarized or aggregate form, that can be understood by the D-servers. Various methods, including periodic or automated methods are used to forward the O-server data to the D-servers. Forwarding of the data can be initiated by either the O-servers or in response to queries from the D-servers. In one embodiment, routines that are integrated into the D-server or O-server or operate separate from either server and that run automatically in the background out of the direct control of a system administrator, e.g., a wrapper daemon, are used to forward data updates from the O-servers to the D-servers. In one embodiment, the routines periodically query a given O-server, extract the desired summarized data and forward the extracted data to the parent D-server. In addition to merely providing retrieval and forwarding, the routine can also reformat the results returned by a search of the O-server into a common format understood by the client.

The hierarchy of D-servers is not limited to using any particular attribute format to monitor and administer the allocation of resources that are contained in a variety of different organizations or domains. In addition, there is not universal or standardized attribute format for resource identification that is imposed on the distributed computing systems. Each computing systems determines and utilizes its own attribute format. Therefore, the schemas, i.e. the list of attributes, used for each type of resource, do not need to be exactly the same for different organizations. The D-servers at the leaf level can map the attributes about a given type of resource received from a variety of O-servers to one or more common attributes used among the D-servers in the hierarchy, even if the various received attributes are different. In one embodiment, one or more of the D-servers, for example the leaf node D-servers communicate to the O-servers a pre-determined common attribute format that is to be used for the resource attribute data in the hierarchy. The communicated common attributes contain a sufficient amount of information to allow each O-server to map the resource data attributes for its resources to the common attributes. This map is communication to the D-servers along with the resource attribute data. Therefore, each autonomous organization has an increased amount of freedom in choosing a resource discovery system, and the hierarchy system can incorporate a wider variety of legacy autonomous systems. No external attribute format or hierarchy is imposed on the individual computing systems.

In one exemplary embodiment of a method for federated resource discovery in distributed systems in accordance with the present invention, resource attribute data associated with a plurality of resources disposed in a plurality of distributed computing systems is communicated from those distributed computing systems to one or more of a plurality of dedicated servers arranged in accordance with a pre-defined hierarchy. In general, the resource attribute data contain a sufficient amount of data about the resources contained in the distributed computing systems to facilitate identification and allocation of the associated resources disposed within the plurality of distributed computing systems. The resources are identified and allocated in response to resource demand queries from clients, for example applications running on one of the servers in the computing systems or within the hierarchy. Suitable computing systems including any arrangement or networked arrangement of computing resources including, but not limited to, an information technology (IT) computing system.

In one embodiment, in order to communicate the resource attribute data to the D-servers, the resource data is actively obtained from each computing system using the D-servers. Alternatively, the O-servers disposed within the plurality of computing systems obtain the resource attribute data for the resources contained within the computing system in which the O-server is located. In one embodiment, each computing system contains two or more O-servers that are used to obtained resource attribute data. Preferably, each computing system contains one O-server for resource attribute data acquisition and communication. The resource attribute data can be communicated to any D-server within the hierarchy. Preferably, for a leaf hierarchy, the resource attribute data are communicated to one of the leaf node D-servers contained within the hierarchy. In one embodiment, a suitable leaf node D-server is identified for each O-server, and the O-servers communicate the resource attribute data to the associated leaf node D-servers.

Each O-server or resource discovery server obtains the resource attribute data for the resources contained within its computing system in the native attribute format for that computing system. For a plurality of computing systems, a plurality of native attribute formats is possible, and each format can be unique. These native formats vary the way resources are accounted for and described including, but not limited to, the name assigned to a particular resource and the types of resources utilized for a given function within the computing system. Each native attribute format for each computing system is determined by and associated with one of the distributed computing systems. A generic or universal attribute format is not imposed upon the various computing systems. Instead, the communicated resource attribute data is mapped, at the D-server level, from the plurality of native attribute formats to a common attribute format. This common attribute format is provided by at least one of the plurality of dedicated servers. Mapping between the common format and the native formats can be conducted at the D-server level or at the O-server level. In one embodiment, the common attribute format is communicated to each one of the O-servers, and the O-servers in communicating the resource attribute data to the D-servers map the communicated resource attribute data from the plurality of native formats to a common attribute format provided by the D-servers. Therefore, both the mapping information in conjunction with the resource attribute data is communicated to the D-servers.

Having communicated the resource attribute data for all of the currently available resources within the distributed computing systems to the D-servers within the hierarchy, a sufficient amount of resource attribute data is maintained at any given dedicated server within the hierarchy of dedicated servers. Therefore, resource queries can be submitted to and processed by any D-server, and these D-servers can route those queries through the hierarchy of dedicated servers to the appropriate distributed computing system or to the appropriate O-server within the computing system that contains a suitable resource for the query. Maintenance of the desired amount of resource attribute data at each D-server is accomplished using aggregation and replication. In one embodiment, the resource attribute data are aggregated at each D-server to which the resource attribute data are communicated from the plurality of computing systems. These aggregated resource attribute data are communicated through one or more intermediate D-servers to a root D-server of the hierarchy. In addition to aggregating the resource attribute data at the leaf node D-servers, the resource attribute data are further aggregated at each one of the intermediate dedicated servers as the data are communicated upward through the hierarchy.

In one embodiment, the resource attribute data maintained at each dedicated server within the hierarchy are replicated at one or more additional dedicated servers within the hierarchy, for example siblings and ancestors within the hierarchy. Since the status and available of any given resource, i.e. the resource attribute data associated with that resource changes over time, the resource attribute data maintained in the D-servers are periodically updated. For example, a time to live value is identified for each resource attribute datum communicated to the dedicated servers. This is the prescribed conditions or period of time in which an update has to be received or that datum expires. Resource attribute data are deleted from the dedicated servers when updates are not received in compliance with the identified time to live values.

Exemplary embodiments for consistency assurance in accordance with the present invention include a method updating data, e.g. summaries or data aggregations, stored in a plurality of nodes linked through a network hierarchy. The dynamic attributes of resources, for example data rates and available bandwidth, and the summaries produced that contain these dynamic resources, continuously change over time. Since the aggregated summaries are replicated throughout the hierarchy of nodes or servers and are used to guide the search, the summaries are preferably updated quickly enough to reflect the current state of the resources. Methods for updating the data stored on the plurality of nodes ensure a given level of consistency between the replicated summaries and the original summaries.

The propagation of summaries throughout the hierarchy of nodes occurs periodically along each link in the hierarchy. These links are connections or paths between two nodes in the hierarchy and can be viewed as representing branches or trunks in the hierarchy. Each time a summary is propagated through the hierarchy overhead such as communication overhead is incurred. More frequent propagation, i.e. more frequent updating consumes more overhead, while less frequent updating adversely effects the consistency between current summaries and the propagated copies of these summaries. Therefore, a tradeoff exists between the consistency level and the replication overhead. The more frequent a summary is replicated along the links, the better the consistency. However, this is achieved at the cost of increased replication overhead. Systems and methods in accordance with the present invention optimize this balance between consistency and the consumption of overhead.

The concept of freshness is used to quantify the consistency. As used herein, the freshness of a replicated summary is the elapsed time or lag time since the generation of the original summary. Such a metric represents how fresh or outdated the replicated copy is and can also reflect how large or significant any change in value of the original summary may have occurred since the replicated summary was obtained from the original summary. This can also be expressed as a freshness threshold, or the maximum duration or period of use before data is refreshed, for any data or replicated summary that is stored at any given node. For example, for an original node or server A and a replication server B the data summary maintained at A can be represented using a stationary random process X(t) with an autocorrelation function of $R_{XX}(\tau)$. The replica of this data summary at B, denoted as X'(t), is X(t−∂), where ∂ is the elapsed time. The average value difference between these two random processes can be represented by:

$$E[(X(t)-X'(t))^2]=2R_{XX}(0)-2R_{XX}(\delta) \quad (1)$$

Therefore, the difference in value between the replicated summary and the original summary is a function of the elapsed time δ. This elapsed time can be transformed into difference in value, and vice versa, and any limitations or requirements regarding this value difference are achieved by specifying the freshness, lag time or maximum duration of a given replicated summary or any other type of data that is communicated or replicated through a hierarchy of nodes.

Figure 4:
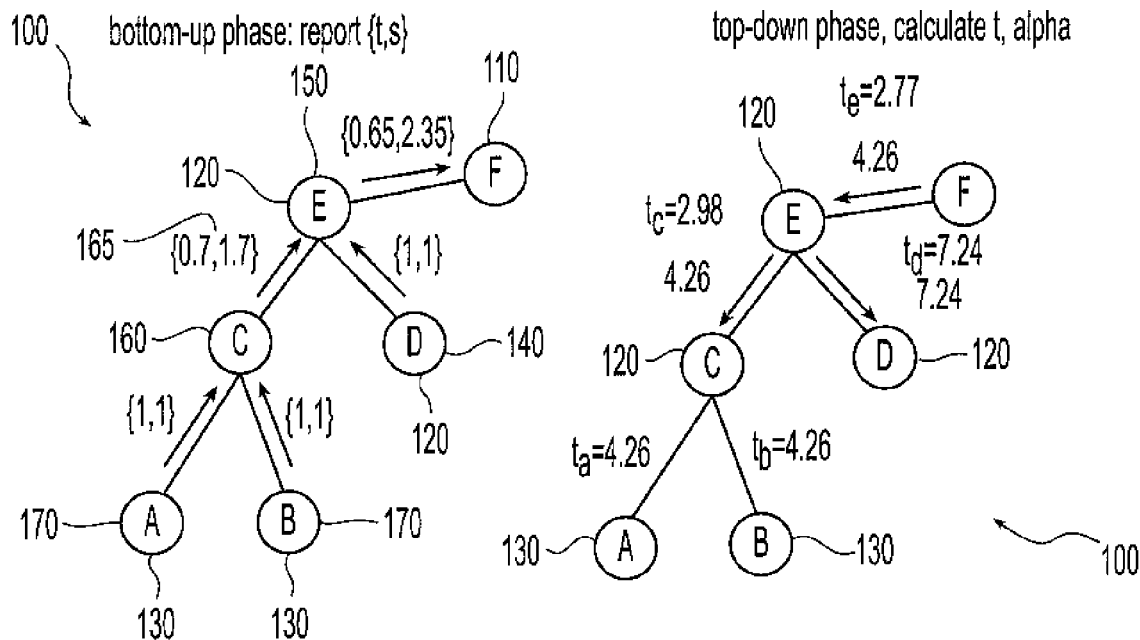
FIG. 4 is a schematic representation of an embodiment of a replication tree hierarchy of nodes for use in replication and consistency assurance.
Figure 5:
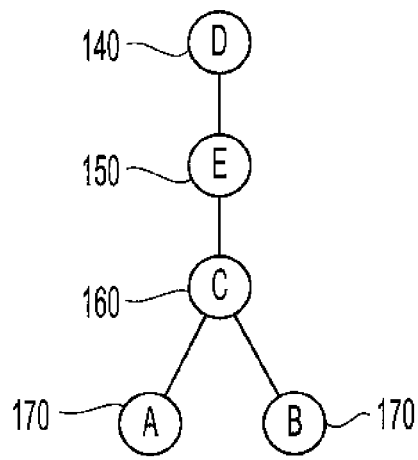
FIG. 5 is a schematic representation of an embodiment of a node from a tree hierarchy arranged as a root node.

Referring to FIG. 4, a plurality of nodes arranged in a networked hierarchy 100 are illustrated. Although illustrated as a tree hierarchy, methods in accordance with the present invention can be used with other types of hierarchies as described herein. Each hierarchy includes at least one root node 110, one or more intermediate nodes 120 and one or more leaf nodes 130. Within this network hierarchy, the various servers or nodes create summaries and propagate these summaries through the hierarchy, for example as described above, to a given node's parent, siblings and its siblings' descendants. As illustrated, for example, node D's 140 summary is propagated and replicated to its parent node E 150, its sibling node C 160 and its siblings' descendant nodes A and B 170, which are the leaf nodes. For each node in any given networked hierarchy of nodes, there exists a replication tree in which that node is the root having its parent at the next level, and its siblings and their descendants farther down (FIG. 5). One replication tree can be identified for each node, and a plurality of such replication trees exist within the same networked hierarchy.

This tree rooted in a given node contains a set of n nodes, V, that includes its parent, its siblings and its siblings' descendents. For each node $v_i \in V$, $T(v_i)$ denotes the period at which the parent node of $v_i$ sends updated data or its current original summary to node $v_i$. For update messages having substantially the same size, the replication overhead on this link, i.e. the link between the parent node and $v_i$, is given by $1/T(v_i)$. The maximum elapsed time for node $v_i$, denoted by $\delta(v_i)$, is the sum of the update periods of all ancestors of node $v_i$. This occurs when each ancestor updates its next hop child vafter v's updating period T(v). For example (FIG. 4), $\delta(A)=T(C)+T(E)+T(A)$.

In accordance with one embodiment of the present invention, a target freshness bound or maximum duration C for any data, e.g. replicated summary, stored at any given node within the network hierarchy is defined. Given this maximum duration, a replication period or update period $T(v_i)$ across each one of a plurality of links between the nodes in the network hierarchy for data stored at each node is determined such that the freshness threshold is satisfied for all data stored at any given node and the overall overhead associating with updating the data, i.e. replication, is minimized. The data are then updated in accordance with the determined update periods. This can be represented mathematically for the optimal consistency assurance problem as follows: Select $T(v_i)$ for each node $v_i$ so that $$\text{MIN} \sum_{k=1}^{n} 1/T(v_i), \, s.t. \forall \, v_i \in V, \, \delta(v_i) \le C, \, \& \forall \, v_i \in V, \, T(v_i) > 0.$$

In general, this optimization problem has a non-linear convex objective function with linear constraints and may not have a closed-form solution. However, by observing several constraints a closed-form solution structure can be derived. The first constraint is a leaf node constraint wherein for any leaf node w, the lag time bound is tight, i.e., $\delta(w)=C$. This can be proved through contradiction. For example, suppose that in the optimal solution Ω, the lag time bound is not tight at a leaf node w, then we have $\delta(w)<C$. Let $\epsilon=C-\delta(w)>0$. The value of T(w) can be increased to T(w)+ε. All of the constraints are still satisfied, but the object function is smaller. Therefore, Ω is not optimal.

The second constraint is the common ancestor constraint and states that for two leaf nodes $w_1$ and $w_2$ that share a common ancestor u, the sum of the update periods along the path from u to $w_1$ is the same as that from u to $w_2$. This provides as follows. The leaf node constraint yields that $\delta(w_1)=\delta(w_2)=C$. Along the path from u to $w_1$, the sum of update periods is $\delta(w_1)-\delta(u)=C-\delta(u)$, and the same holds for the path from u to $w_2$.

Using the leaf node constraint, the original optimization problem is rewritten by changing the inequality constraint to an equality one: $\forall$ leaf node $w, \delta(w)=C$. Non-leaf nodes are excluded from the constraint, because for any non-leaf node $u, \delta(u)$ is strictly less than that of its leaf descendants. The standard Lagrangian method is applied to solve the optimization problem, yielding the following solution structure, which is the parent-child constraint. The parent-child constraint states that the minimum total replication or updating overhead is achieved when for any non-leaf node u and its children set Child(u), $$1/T(u)^2 = \sum_{v \in Child(u)} 1/T(v)^2 \qquad (2)$$

Based on these three constraints a simple and light-weight distributed algorithm is used to implement the optimal solution. In one embodiment, the implementation of the algorithm is illustrated in the following pseudo code.
Algorithm: Optimal consistency assurance algorithm
Require: Parent P, children list C[1, ..., k]

```
 1:  //Initialization
 2:  t = 1;s = 1;α[1] = ... = α[k] = 1
 3:  // Bottom-up phase
 4:  if I am a leaf node then
 5:      Send t and s to P
 6:  else
 7:      Wait until I receive reports from C[1],..., C[k]
 8:      rt[1,..., k] = values of t in the received reports
 9:      rs[1,..., k] = values of s in the received reports
10:      // Applying common ancestor constraint
11:      for i = 2 to k do
12:          α[i] = rs[1]/rs[i]
13:          rs[i] = rs[1]
14:          rt[i] = rt[i] × rs[1]/rs[i]
15:      // Applying parent-child constraint
16:          t = 1 / √((1/rt[1])² + ... + (1/rt[k])²)
17:          s = rs[1] + t
18:          Send t and s to P
19:      end for
20:  end if
21:  // Top-down phase
22:  if I am the root then
23:      //Applying the leaf node constraint
24:          scale = C / rs[1]
25:  else
26:      Wait until I receives scale from P
27:  end if
28:  t = t × scale
29:  for i = 1 to k do
30:      α[i] = α[i] × scale
31:      Send α[i] as scale to C[i]
32:  end for
```

In the algorithm, any given node stores or maintains several types of state data. The state data include t, which is the current update period associated with the given node and which expresses the period at which the parent node of the given node should send the summary of data update to the given node, and s, which is the sum of replication periods or data update periods along the path from the parent node of the given node to any child leaf node of the given node, that is any child leaf descendants of the given node (s is the same for all leaf descendants). The state data also include a scale factor α, and one scale factor is maintained for each child node of the given node. The scale factors are maintained at all nodes except the leaf nodes, because leaf nodes do not have any children nodes. In one embodiment, every node initializes its state data to the value of 1.

Exemplary embodiments of the method for updating the stored data function in two non-overlapping phases. The first phase is bottom-up reporting of the current state data stored at every node through the hierarchy of nodes to a root node. For example, each node forwards or reports is current t and s to its parent node, starting, for example, from the leaf nodes. After a given node, that is a non-leaf node, receives the t values from at least one and preferably all of its children nodes, that node determines whether or not all of the s values communicated in the state data are the same, as is required by the common ancestor constraint. If all of the s values are the same, then the given node utilizes the parent-child constraint in combination with the data update periods communicated in the state data to compute a t for that receiving node. For example (FIG. 4), node C 160 computes its $t_c$ 165 as $$1 / \sqrt{1/t_A^2 + 1/t_B^2} = 1/\sqrt{2} \approx 0.7.$$

When it is determined that the s values are different and are not equal, the given node adjusts the s values to be equal. In one embodiment, the given node picks an arbitrary child node, which has an s values of $s_0$. The given node then uses the sum of the data update periods associated with the arbitrary child node, i.e. $s_0$, to calculate a scale factor for every other child node of the given node. This scale factor is expressed as $\alpha_i = s_0/s_i$. The given node then uses these calculated scale factors to calculate updated state data for all of the children of the given node, i.e. $t_i = t_i\alpha_i, s_i = s_i\alpha_i = s_0$.

After adjusting all of the s values to be equal, the given node uses the parent-child constraint to compute its own t, and its owns as $t+s_0$. The given node then reposts or communicates its state data, {t,s}, to its parent node. For example node E receives {0.7,1.7} from node C, and {1,1} from node D. The s values are not equal, so node E scales the state data of node D to {1.7,1.7} and then computes its own $t_E$ as $$1 / \sqrt{1/0.7^2 + 1/1.7^2} \approx 0.65.$$

Node E sends {0.65,2.35} to its parent node F.

Ultimately, a root node, F, receives the state data reports from all its children, and the root node adjust the values in the state data so that all of the leaf nodes have exactly the defined maximum duration of lag time bound C. In one embodiment, the root node compares the value of s, after adjusting s to be equal among all of the children nodes if necessary, to C and obtains a root scale factor C/s. The root node then updates the t of each child node as tα. For example, given the maximum data duration C=10, root node F computes $\alpha=10/2.35 \approx 4.26$.

Therefore, the root node updates $t_E$ to 0.65×4.26=2.77, which is the period at which it should update its child node E.

Having reported the state data from the bottom, i.e. the leaf nodes, up to the top, i.e. the root node, and applying any scaling factors at the root node, the second phase is executed. The second phase is a top-down phase, in which starting from the root node the corresponding scale factor is sent to each child. After receiving the scale factor from its parent, a node multiplies the scale factor with the adjusted t values of its children nodes to obtain the final data update periods. For example, node E receives 4.26 from parent node F and updates $t_C$=4.26×0.7=2.98 and $t_D$=4.26×1.7=7.24. These are the data update periods at which node F should send data updates to its children nodes C and D. If the node is a non-leaf node, that node also updates the scale factors, $\alpha$, for its children nodes by multiplying them by the scaling factor received from its parent node. The node then sends the updated scaling factor to the appropriate child node. For example, node E multiplies 4.26 with the old $\alpha$,1 and 1.7 for C and D and obtains 4.26 and 7.24. The node then sends these values to C and D, respectively. Ultimately, all non-leaf nodes receive the scaling factors and obtain the update periods to their children nodes. For example, node C knows it should update nodes A and B at 4.26×1=4.26.

Distributed algorithms in accordance with exemplary embodiments of the present invention utilize very small amounts of overhead. For example, it incurs only O(k) state at each node or server, where k is the number of children nodes of a given node, and O(1) message overhead along each link, where one bottom-up and one top-down message is sent over each link.

EXAMPLE

An exemplary evaluation of the performance of systems and methods in accordance with the present invention was conducted using two metrics, query response time and message overhead. Response time is the time from a client sending a query to the client receiving all matching records. Message overhead is the total size of all control messages.

Figure 6:
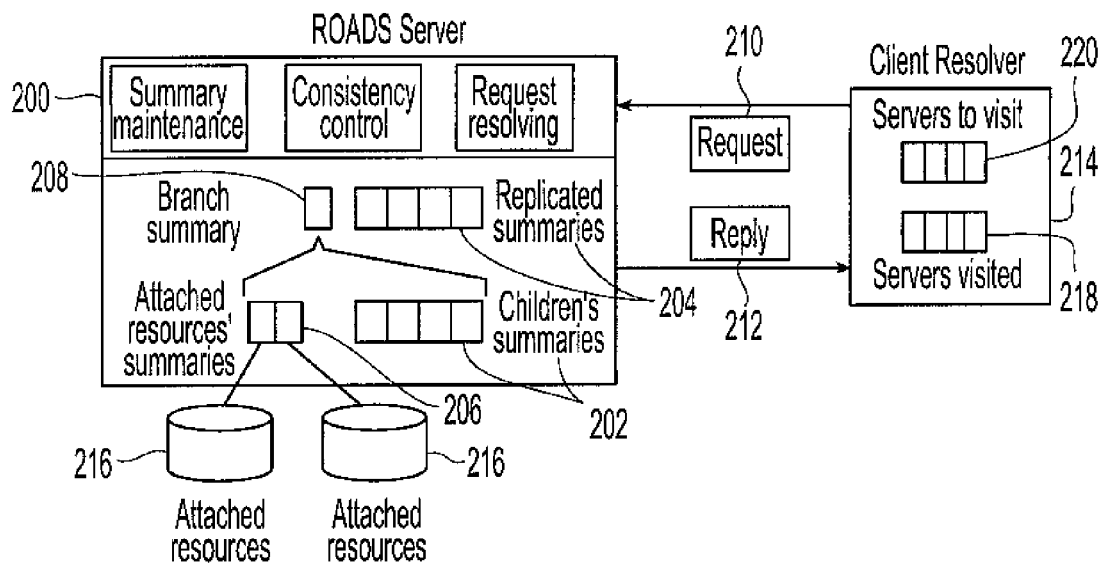
FIG. 6 is a schematic representation of an embodiment of a resource discovery server for use with the present invention.

A resource discovery server and resolver were implemented using Java. As illustrated in FIG. 6, a server 200 maintains 4 types of summaries, its children's 202, replicated summaries 204, directly attached resources' 206, and its branch summary 208. Two types of messages, REQUEST 210 and REPLY 212, are used to discover resources. A client contacts or calls the resolver 214 to discover resources. After receiving a REQUEST from the resolver, a server checks the summaries of attached resources and further queries the attached resources 216 for detailed records if any match is found. The server also checks its children's and replicated summaries. The matches will be included as referrals in the REPLY message back to the client.

To avoid loops, the resolver 214 maintains two queues for each client request, "visited" 218 for servers it has queried and "to visit" 220 for referred servers it has yet to query. The resolver checks whether a referred server is already in the queues. A referred server is added to the "to visit" queue only when it is in neither queue and is moved to "visited" queue after the resolver queries the server. Because the resolver can receive multiple referrals, the resolver is made multi-thread and launches one thread for each of the servers in the "to visit" queue.

Resource discovery is run in a test bed of 5 SuSe 9 SP2 Linux machines, each with Xeon 3.4 GHz CPU and 6 GB memory. The DB2 database is used to emulate attached resources. Each resource record has 120 attributes, including integer, double, timestamp, string, categorical types. The lower and upper bounds and histogram summary methods are implemented for numeric, timestamp and string (using dictionary order) types, and set union for categorical types. Each database is populated using both randomly generated and real data, for example city and state locations and people's names. Each database has 200K records, and a server can use a Java Database Connectivity (JDBC) interface to query the database for detailed resource records or to generate summaries. For benchmark, the resource discovery is compared to a centralized approach where all the records are stored in one central database.

The resolver load is a set of multi-dimensional queries. Queries are grouped based on their selectivity, i.e. the percentage of resource records that satisfy the query. There are 6 selectivity groups, 0.01%, 0.03%, 0.1%, 0.3%, 1% and 3%, each having 20 queries.

The total response time is the summation of all rounds of REQUEST-REPLY exchange between the resolver and the resource discovery servers. Because of the multi-threaded resolver, a client can search multiple branches in the hierarchy in parallel. Therefore, the total response time is decided by the longest search path. In the worst case, the longest path starts from the root server or any entry point server and ends at the deepest down leaf servers, assuming these servers have matching records. The length of such paths, and hence the rounds of REQUEST-REPLY exchange, is O(log N), where N is the total number of servers in the hierarchy. In reality, these servers may not have any matching records, and the search may stop well before reaching such depth. Thus the average response time is less.

The resource discovery response time (both multi-thread and single thread resolvers) is compared with a centralized repository. The set up is always worst-case for the resource discovery, i.e. all servers are queried. Experiments for two scenarios were run, resource owners without and with indexes. Depending on each resource owner, some may use simple directory service implementations without index support.

Figure 7:
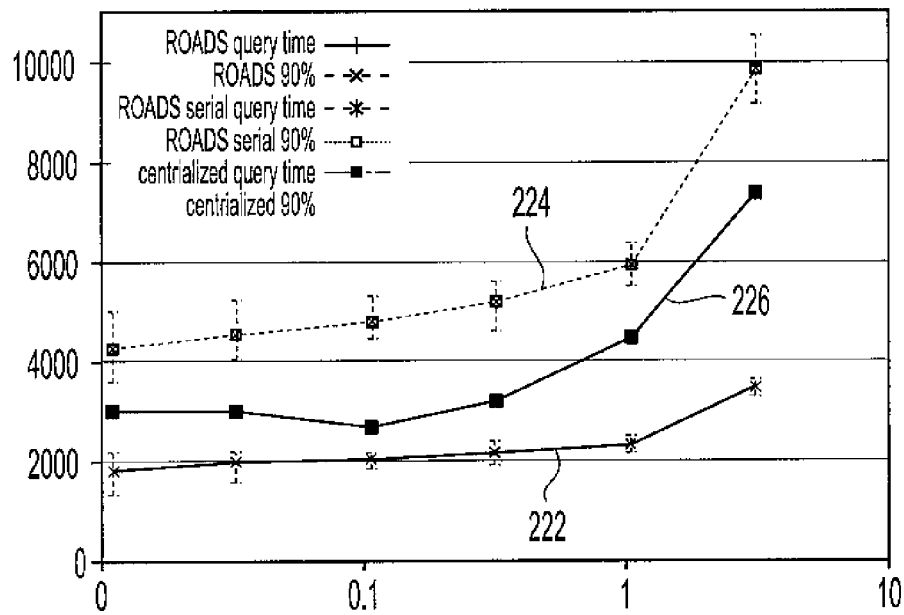
FIG. 7 is a graph illustrating total response time as a function of query selectivity when indexes are not available.

Referring to FIG. 7, the multi-thread version 222 reduces response time by 50%-70% compared to single thread 224, and 20%-50% compared to centralized repository 226. The Resource discovery in accordance with the present invention outperforms centralized repository because, without proper index, the majority of time is spent on individual directory services scanning the resource records and sending matching ones. The multi-thread resolver allows multiple directory services to scan and send their records simultaneously, which completes earlier than one directory service doing all records.

Figure 8:
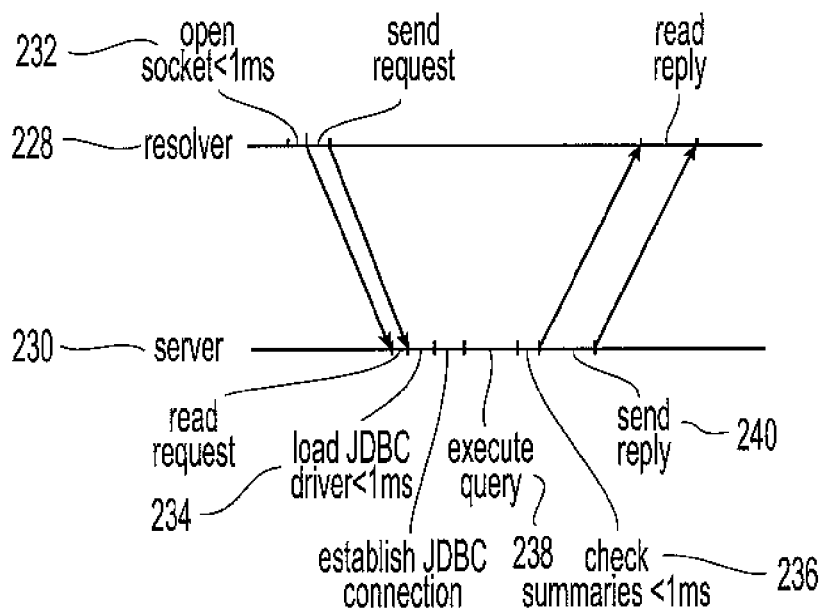
FIG. 8 is a schematic representation of an embodiment of the time breakdown of a request and reply query exchange in accordance with the present invention.
Figure 9:
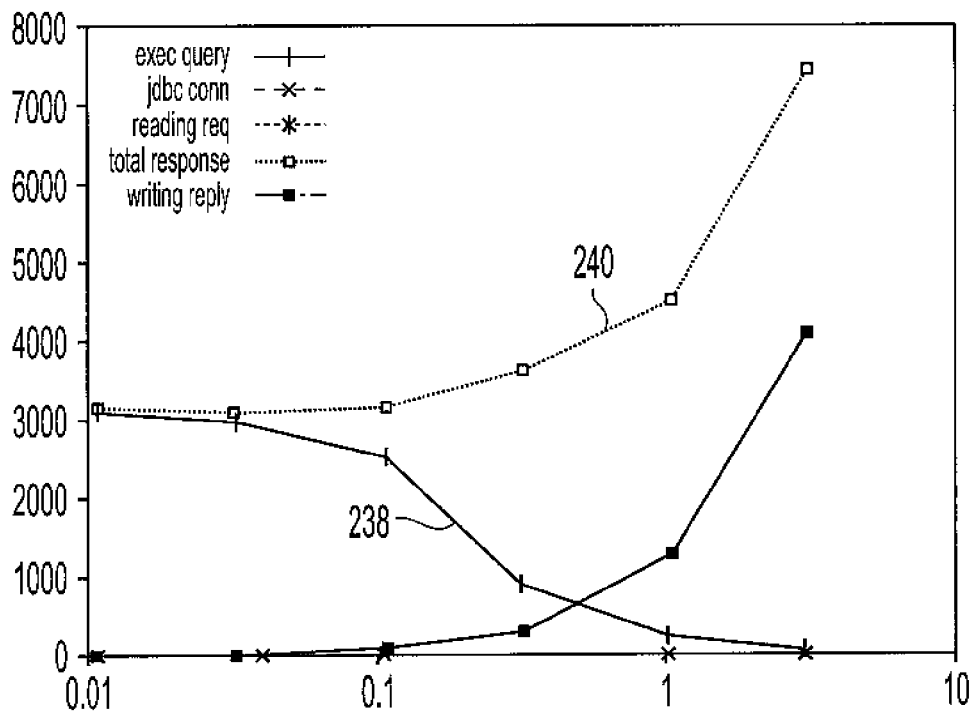
FIG. 9 is a graph illustrating the major portions of response time as functions of query selectivity when indexes are maintained.

As shown in FIG. 8, the detailed breakdown of time during a REQUEST-REPLY exchange between a resolver 228 and a server 230 is illustrated. Three parts, opening socket 232, loading JDBC driver 234 and checking summaries 236 are much smaller (<1 ms) compared to others. Therefore, these parts are not included in the graph in FIG. 9, which shows each step's average time as a function of query selectivity. It confirms that the dominating parts are query execution 238 and REPLY sending time 240.

Figure 10:
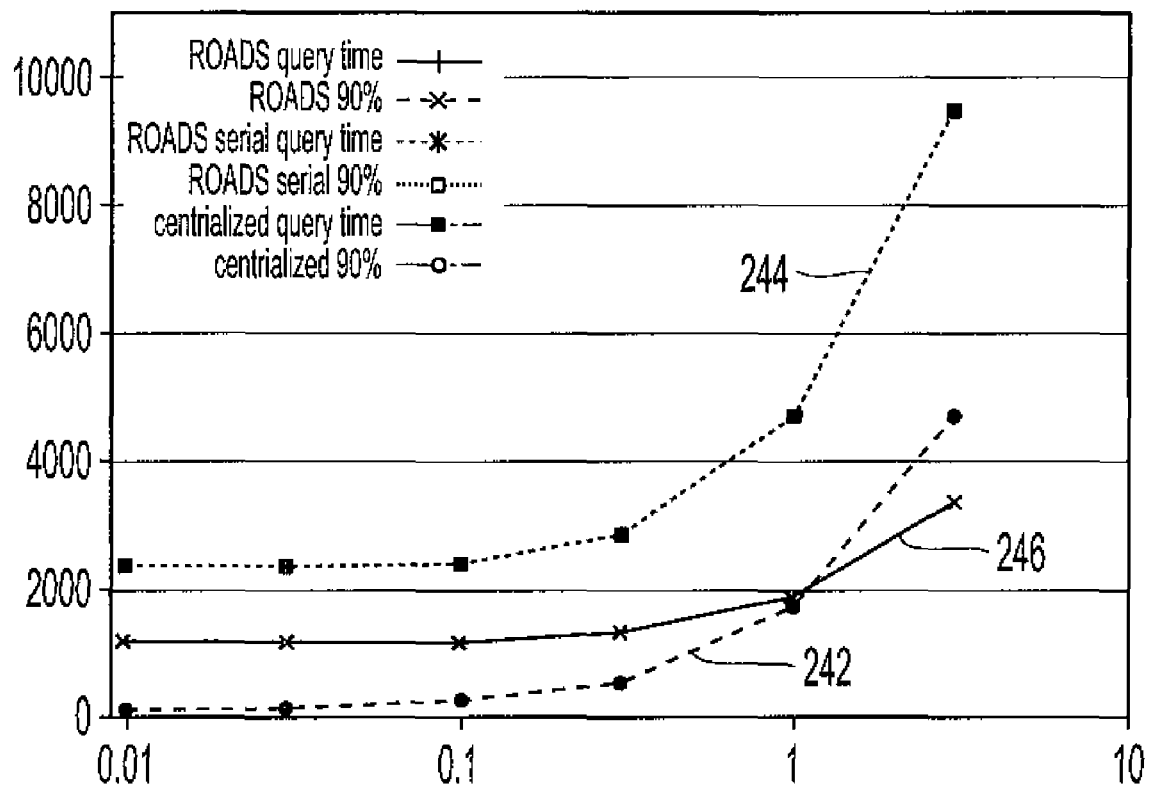
FIG. 10 is a graph illustrating response time versus selectivity.

When resource owners use directory service with index support, the response time comparison is shown in FIG. 10. This time the multi-thread version 242 still outperforms the single thread 244 by 50%-70%, but the centralized repository 246 is faster when selectivity is low. As selectivity increases, however, more records are sent and the performance of resource discovery becomes comparable again. Resource discovery doubles the response time when selectivity is 0.3%, approaches about the same for 1%, and outperforms central repository again, by 25% when selectivity becomes 3%. From the above comparisons, we conclude that the performance of resource discovery in accordance with the present invention is comparable to central repository.

With regard to message overhead, resource discovery utilizes control messages, including the bottom-up and top-down consistency control messages. These control messages contain only a few state data variables and are of constant sizes. The RE-QUEST messages contain the query, which contains quantifiers and is bound by the total number of attributes in resource record and is also constant size. The REPLY messages have sizes proportional to the numbers of returned referrals or records.

The remaining messages are the replication messages. The replication overhead of resource discovery in accordance with the present invention is compared with that of a central repository. Assuming there are N records, each of which has n numeric attributes and c categorical attributes. A numeric attribute uses lower/upper bounds or a histogram for summary, both of which are constant sizes. Assuming such a summary is of size $s_1$, and a numeric value is of size $s_2$, for each categorical attribute, assuming set union is used, the size for each value is $s_3$, and there are k distinct values in the N records. Thus the summary for all N records is $S_{summary}=ns_1+cks_3$, and the original data size is $S_{origin}=N(ns_2+cs_3)$.

Given the attributes in records, $S_{summary}$ is O(1) as n,c are constant. $S_{origin}$ is O(N), which grows proportional to the total number of replicated records. Thus resource discovery can keep replication overhead constant regardless of the number of resource records, while central repository has linear overhead.

Figure 11:
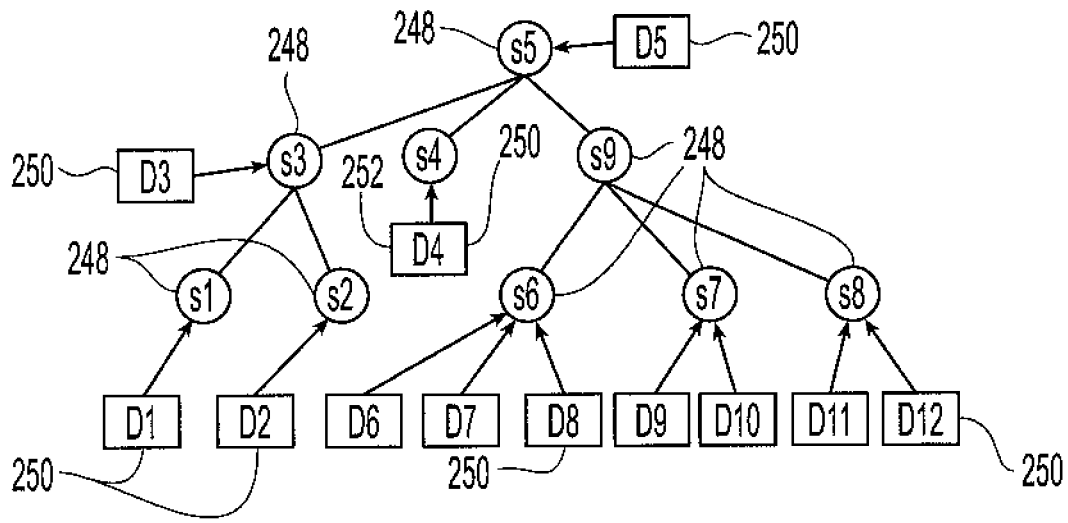
FIG. 11 is a schematic representation of the replication of summaries through a tree hierarchy.
Figure 12:
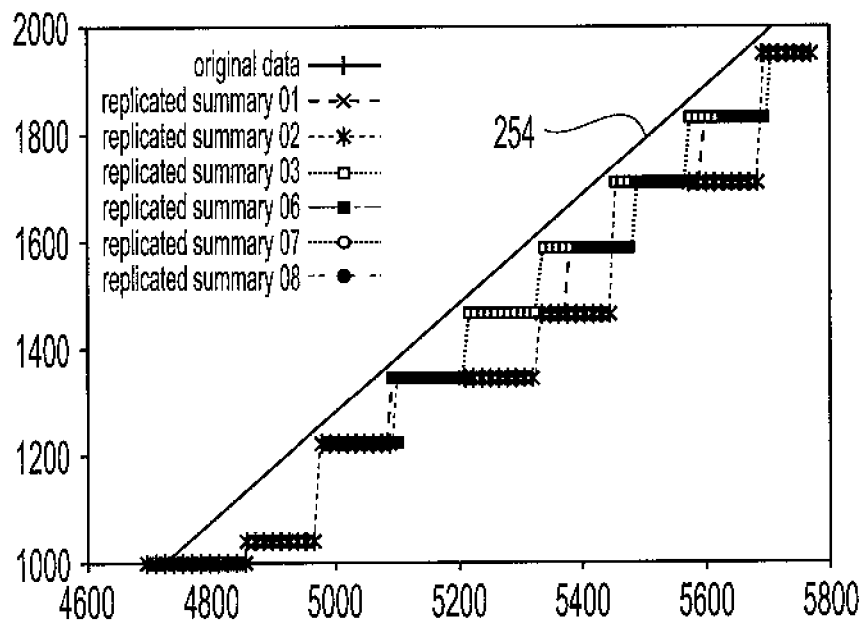
FIG. 12 is a graph illustrating the tracking of changes in the original summaries by the replicated summaries.

With regard to consistency control, resource discovery in accordance with the present invention has the ability to keep the consistency within a given bound. FIG. 11 shows a demo setup that consists of 9 resource discovery servers 248 and 12 individual resource owners 250. The upper bound of the summary of data_rate, a dynamic attribute of the resources of owner D4 252 is allowed to increase by one each second. The target freshness bound is set to 250 seconds, and the upper bounds of replicated summaries at 6 other servers are tracked. FIG. 12 shows the changes of original upper bound and its replicated copies, as functions of time. As shown, the lag times of all 6 replicated copies are always within the pre-defined bound of 250 254.

Figure 13:
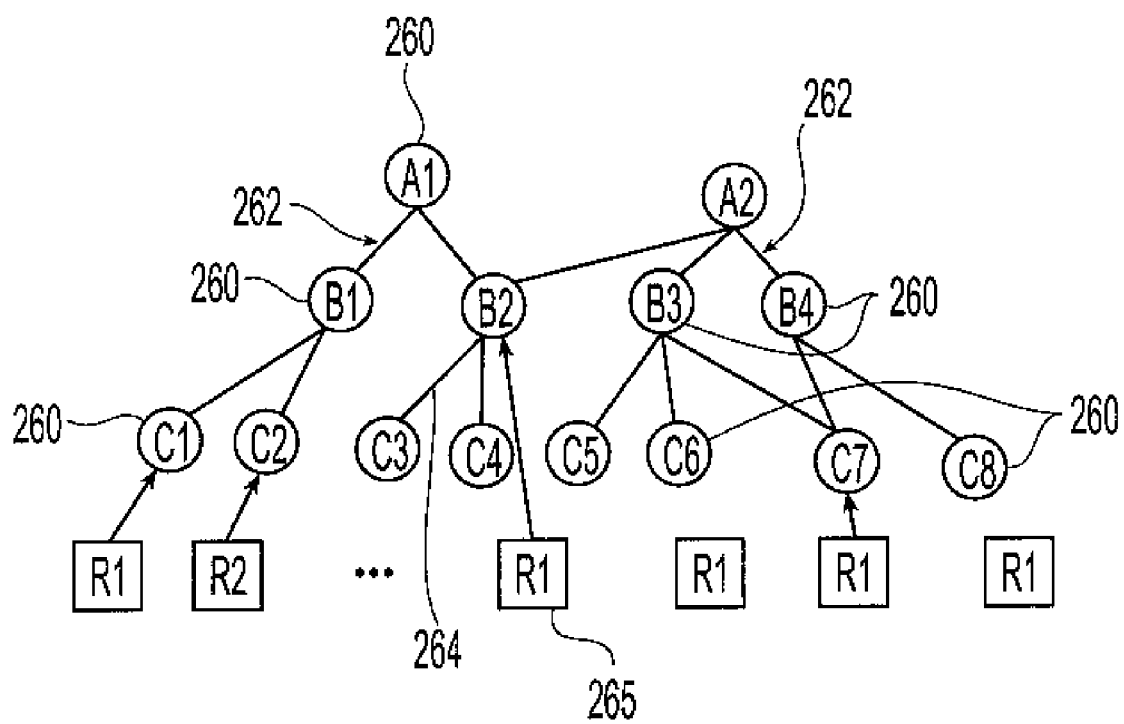
FIG. 13 is a schematic representation of another embodiment of a network hierarchy of nodes for use with the present invention.

Resource discovery systems in accordance with the present invention arranged the servers into a tree hierarchy, with possibly multiple root servers. However, these resource discovery systems can be extended to a more general model where the parent selection is more flexible. For example, each server or node can choose multiple parents simultaneously. Therefore, the servers 260 form trees 262 that may share branches 264 with each other (FIG. 13). This hierarchy arrangement supports more flexible collaboration scenarios. One resource owner 265 might participate in several groups, each of which wants to collaborate for a group-wise purpose. Each group may form its own server tree structure. The attaching point server for this owner thus can join different trees and propagate only resource summaries intended to each group within the corresponding tree.

The collaboration among resource owners can take various forms, and resource discovery in accordance with the present invention can support many different forms. A resource owner may provide equal services to all other parties. In this case it simply exports its resources and allows everybody to search and use them. An owner might also differentiate among users and provide certain resource only to designated parties. The resource discovery server can be extended to search summaries based on user identity. The resource owner can also export different views of its resources to multiple attaching points, and these attaching points accept queries from respective users only.

Overlay constructions in accordance with the present invention allow a server to replicate summaries from its siblings, its ancestors and ancestors' siblings. A resource owner might want to restrict the scope of its summary propagation, might instruct the attaching point not to further propagate its summary or might ask the attaching point to use the coarsest form such as lower/upper bounds in propagated summaries.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for federated resource discovery in distributed information technology systems or a method for updating replicated data stored in a plurality of nodes organized in a hierarchy and linked through networks in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for updating replicated data stored in a plurality of nodes organized in a hierarchy and linked through networks, the method comprising:
    defining a freshness threshold for any replicated data stored at any given node within the network hierarchy of nodes, the freshness threshold comprising a maximum elapsed time from generation of any original data summary from which replicated data are copied; and
    determining an update period across each one of a plurality of links between the nodes in the network hierarchy for replicated data stored at each node such that the freshness threshold is satisfied for all replicated data stored at any given node and overhead associated with updating replicated data is minimized by:
        maintaining state data at each node within the hierarchy of nodes, the state data at a given node comprising:
            a current data update period associated with that node and expressing the period at which its parent node should send a data update; and
            a summation of the data update periods from its parent node to any descendent leaf node of that node; and
            maintaining at each non-leaf node a scale factor associated with each child node of the non-leaf node; and
        updating replicated data stored at the nodes in accordance with the determined update periods, wherein the plurality of nodes are arranged in a tree hierarchy.

2. The method of claim 1, further comprising, communicating the state data maintained at each node up through the hierarchy of nodes to a root node.

3. The method of claim 2, wherein the step of communicating the state data through the hierarchy further comprises:
    calculating, at each node within the hierarchy of nodes receiving communicated state data from its children nodes, a data update period for the receiving node using the data update periods in the communicated state data if all sums of the data update periods communicated in the state data are equal.

4. The method of claim 2, wherein the step of communicating the state data through the hierarchy further comprises:
    determining at a given node that all of the sums of the data update periods communicated in the state data are not equal;
    picking an arbitrary child node of the given node;
    using the sum of the data update periods associated with the arbitrary child node to calculate a scale factor for every other child node;
    using the calculated scale factors to calculate updated state data for all of the children of the given node; and
    communicating the updated state data from the given node up through the hierarchy of nodes.

5. The method of claim 2, further comprising:
    receiving state data at a root node from all children nodes of that root node; and
    making adjustments to the state data received at the root node to ensure that the freshness threshold is achieved at every leaf node of the root node.

6. The method of claim 5, wherein the step of making adjustments further comprises adjusting summation update periods at each leaf node to equal the defined freshness threshold.

7. The method of claim 5, wherein the step of making adjustments further comprises:
    adjusting the summation update periods associated with each leaf node to a common equal value;
    comparing the common equal value to the freshness threshold;
    obtaining a scale factor as the ratio of the freshness threshold to the common equal value; and
    adjusting current update period at each leaf node using the scale factor.

8. The method of claim 7, further comprising:
    communicating the scale factor to each child node of the root node;
    adjusting current update period for each child using the scale factor.

9. A computer-readable medium containing a computer-readable code that when read by a computer causes the computer to perform a method for updating replicated data stored in a plurality of nodes organized in a hierarchy and linked through networks, the method comprising:
    defining a freshness threshold for any replicated data stored at any given node within the network hierarchy of nodes, the freshness threshold comprising a maximum elapsed time from generation of any original data summary from which replicated data are copied; and
    determining an update period across each one of a plurality of links between the nodes in the network hierarchy for replicated data stored at each node such that the freshness threshold is satisfied for all replicated data stored at any given node and overhead associated with updating replicated data is minimized by:
        maintaining state data at each node within the hierarchy of nodes, the state data at a given node comprising:
            a current data update period associated with that node and expressing the period at which its parent node should send a data update; and
            a summation of the data update periods from its parent node to any descendent leaf node of that node; and
            maintaining at each non-leaf node a scale factor associated with each child node of the non-leaf node; and
        updating replicated data stored at the nodes in accordance with the determined update periods, wherein the plurality of nodes are arranged in a tree hierarchy.

10. The computer-readable medium of claim 9, wherein the plurality of nodes are arranged in a tree hierarchy.

11. The computer-readable medium of claim 10, wherein the step of determining the update period further comprises:
communicating, from each node in the hierarchy of nodes to a parent node, its current data update period and a sum of all data update periods from its parent node to one or more leaf nodes, the current data update period comprising a period of time in which a parent node of a given node should send a data update to that node; and
adjusting the communicated current data update periods and update period summations so that the freshness threshold is satisfied at every leaf node within the hierarchy of nodes.

12. The computer-readable medium of claim 11, wherein the step of determining the update period further comprises:
maintaining state data at each node within the hierarchy of nodes, the state data at a given node comprising:
a current data update period associated with that node and expressing the period at which its parent node should send a data update; and
a summation of the data update periods from its parent node to any descendent leaf node of that node; and
maintaining at each non-leaf node a scale factor associated with each child node of the non-leaf node.

13. The computer-readable medium of claim 12, wherein the method further comprises, communicating the state data maintained at each node up through the hierarchy of nodes to a root node.

14. The computer-readable medium of claim 13, wherein the step of communicating the state data through the hierarchy further comprises:
calculating, at each node within the hierarchy of nodes receiving communicated state data from its children nodes, a data update period for the receiving node using the data update periods in the communicated state data if all sums of the data update periods communicated in the state data are equal.

15. The computer-readable medium of claim 13, wherein the step of communicating the state data through the hierarchy further comprises:
determining at a given node that all of the sums of the data update periods communicated in the state data are not equal;
picking an arbitrary child node of the given node;
using the sum of the data update periods associated with the arbitrary child node to calculate a scale factor for every other child node;
using the calculated scale factors to calculate updated state data for all of the children of the given node; and
communicating the updated state data from the given node up through the hierarchy of nodes.

16. The computer-readable medium of claim 13, wherein the method further comprises:
receiving state data at a root node from all children nodes of that root node; and
making adjustments to the state data received at the root node to ensure that the freshness threshold is achieved at every leaf node of the root node by:
adjusting the summation update periods associated with each leaf node to a common equal value;
comparing the common equal value to the freshness threshold;
obtaining a scale factor as the ratio of the freshness threshold to the common equal value;
adjusting current update period at each leaf node using the scale factor;
communicating the scale factor to each child node of the root node; and
adjusting current update period for each child using the scale factor.

17. A method for updating replicated data stored in a plurality of nodes organized in a hierarchy and linked through networks, the method comprising:
defining a freshness threshold for any data stored at any given node within the network hierarchy of nodes; and
determining an update period across each one of a plurality of links between the nodes in the network hierarchy for data stored at each node such that the freshness threshold is satisfied for all data stored at any given node and the overhead associated with updating data is minimized by
communicating, from each node in the hierarchy of nodes to a parent node, its current data update period and a sum of all data update periods from its parent node to one or more leaf nodes, the current data update period comprising a period of time in which a parent node of a given node should send a data update to that node; and
adjusting the communicated current data update periods and update period summations so that the freshness threshold is satisfied at every leaf node within the hierarchy of nodes; and
updating data stored at the nodes in accordance with the determined update periods;
wherein the plurality of nodes are arranged in a tree hierarchy.

* * * * *